INVENTOR.
RALPH E. ROPER

Aug. 2, 1966    R. E. ROPER    3,263,477
APPARATUS FOR FORMING METALLIC RING MEMBERS
Original Filed Jan. 19, 1962    6 Sheets-Sheet 2
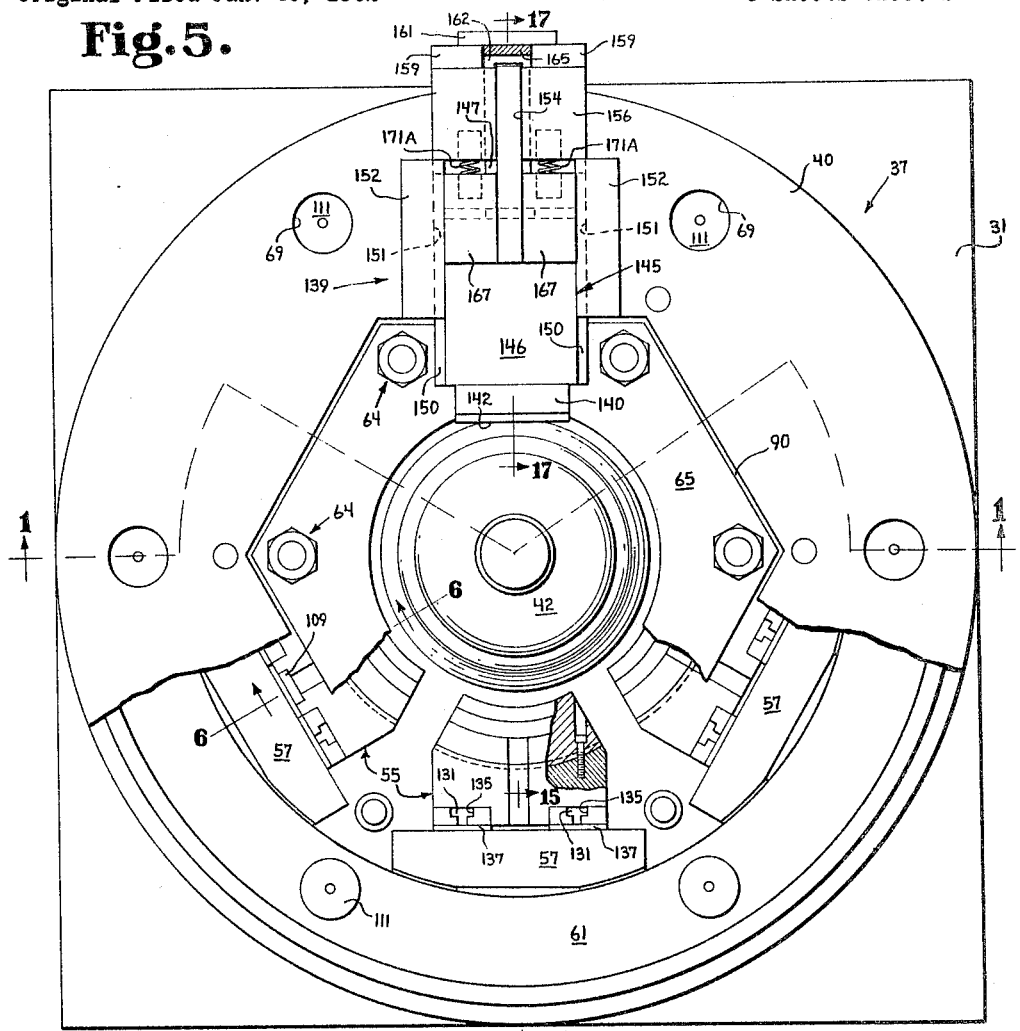
Fig. 5.
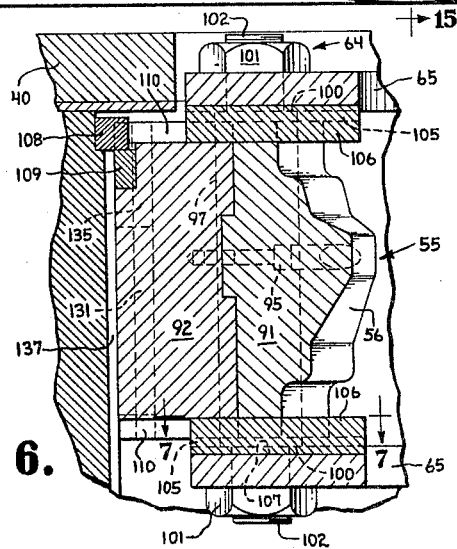
Fig. 6.
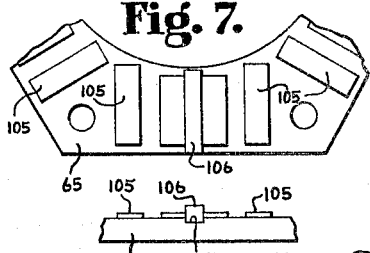
Fig. 7.
Fig. 8.
INVENTOR.
RALPH E. ROPER
BY
Lockwood, Woodard, Smith & Weikart
Attorneys

INVENTOR.
RALPH E. ROPER

INVENTOR.
RALPH E. ROPER
BY
Lockwood, Woodard, Smith & Weikart
Attorneys

United States Patent Office 3,263,477
Patented August 2, 1966

3,263,477
APPARATUS FOR FORMING METALLIC
RING MEMBERS
Ralph E. Roper, Indianapolis, Ind., assignor to Wallace Expanding Machines, Inc., Indianapolis, Ind., a corporation of Indiana
Continuation of application Ser. No. 167,320, Jan. 19, 1962. This application Apr. 28, 1965, Ser. No. 453,559
9 Claims. (Cl. 72—401)

This application is a continuation of my application, Serial No. 167,320, filed January 19, 1962, and now abandoned.

The present invention relates to forming apparatus particularly adapted for forming annular members which flare at opposite ends such as automobile wheel rims and the like.

Various means and methods such as spinning are available for the final forming of double-flaring annular wheel rims. While such methods and means are workable, they have not proved completely satisfactory in all respects. For example, the accuracy of conventional wheel forming apparatus is only sufficient to hold tolerances in diameter within a range of .020 inch.

Consequently, one object of the present invention is to provide improved forming apparatus capable of extreme accuracy in forming wheel rims.

A further object of the present invention is to provide improved metal forming apparatus.

Still another object of the present invention is to provide improved apparatus for forming double-flaring annular members.

A further object of the present invention is to provide forming apparatus incorporating improved means for supporting the workpiece and for removing it from the forming die.

Still another object of the present invention is to provide apparatus for forming wheel rims which cuts down "thin out" or reduction in thickness of the workpiece during the forming operation.

Related objects and advantages will become apparent as the description proceeds.

One embodiment of the present invention comprises a forming apparatus including a pair of coaxial generally conical dies facing toward one another. Means are provided for moving the dies together whereby they may be seated within the opposite ends of an annular workpiece in engagement with the inner surface of the workpiece. There is also provided a plurality of outer dies arranged in a pattern coaxial with the generally conical dies and means for moving the outer dies radially inwardly to a position wherein the inner surfaces of the outer dies engage the outer surface of the workpiece and cooperate with the generally conical dies to form the workpiece, said outer dies defining an annular configuration in said position.

The full nature of the invention will be understood from the accompanying drawings and the following description and claims.

FIG. 5 is a top plan view of the ring forming apparatus of the present invention showing the apparatus with certain portions removed and certain portions broken away for clarity.

FIG. 6 is an enlarged vertical section taken along the line 6—6 of FIG. 5 in the direction of the arrows.

FIG. 7 is a top plan fragmentary view of a horizontal ring element forming a part of the structure, FIG. 7 being taken along the line 7—7 of FIG. 6 in the direction of the arrows.

FIG. 8 is a side elevation of the structure illustrated in FIG. 7.

Figure 1:
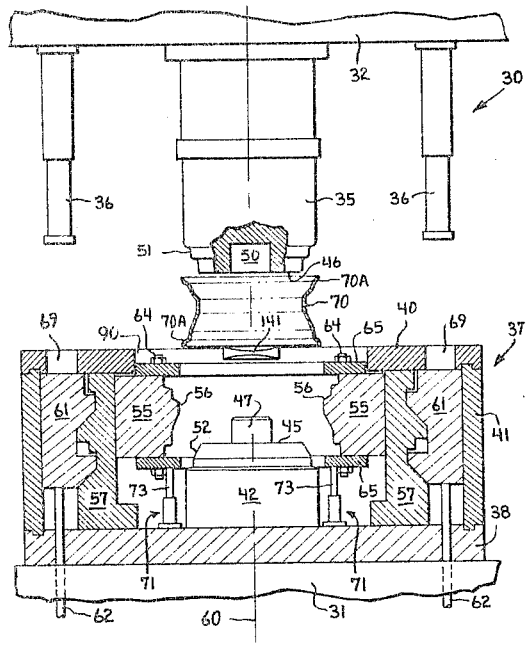
FIGS. 1, 2, 3 and 4 are vertical sections through a ring forming apparatus embodying the present invention, said sections having certain details removed for clarity, showing the general operation of the apparatus and various operating positions and being taken along the line 1—1 of FIG. 5.

Referring more particularly to the drawings, FIGS. 1–4 disclose the general structure and operation of the present apparatus. The apparatus includes a press 30 comprising a stationary base 31 and an upper movable platen 32 which is vertically reciprocable with respect to the base 31. Mounted upon the upper movable platen is an upper die 35 and a plurality of downwardly projecting posts 36 arranged in a concentric pattern about the upper die 35. A housing 37, including a base member 38, an annular top 40 and a cylindrical wall 41 fixed therebetween, supports a lower die 42 which projects from base member 38 upwardly toward the upper die 35 and is coaxial therewith.

Figure 4:
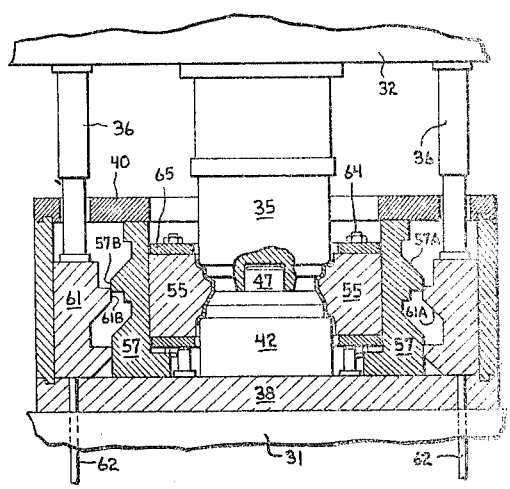

The lower die 42 has an upwardly facing flat surface 45 against which the lower surface 46 of the upper die "bottoms" when the platen 32 is in its lowermost position (FIG. 4). The upper and lower dies are guided into a perfectly coaxial relationship by means of an upwardly extending cylindrical pilot member 47 having the same diameter as and coaxial with a downwardly opening recess 50 in the lower surface of the upper die 35.

The forming surfaces of the upper and lower dies are the surfaces 51 and 52, respectively, these surfaces being generally conical in shape but having certain annular ridges and hollows and in the present embodiment being used to form the internal surface of a wheel rim such as form a part of an automobile and truck wheels. Mounted within the housing 37 are a plurality of outer die sections 55 having inwardly facing forming surfaces 56 which define an annular shape complementary to the surfaces 51 and 52 of the upper and lower dies when all of the outer die sections 55 are moved inwardly to the position of FIG. 4. The function of the outer die sections 55 is to form the outer surface of the automobile wheel rim.

Each of the die sections 55 is mounted in a manner to be described for only vertical movement with relation to die carrying elements 57, each of which is, in turn, mounted for only radial movement with respect to the axis 60 of the upper and lower dies. The die carrying elements 57 are moved inwardly or outwardly by an annular cam member 61 which is movable downwardly by means of the posts 36 and is movable upwardly by means of rods 62 connected to hydraulic pistons (not shown). The annular cam 61 is connected in a manner to be described to the die carrying elements 57 whereby upward movement of the annular cam moves the die carrying element radially outwardly and downward movement of the annular cam moves the die carrying elements radially inwardly. A pair of horizontal ring elements 65 are fixed in spaced relation by means of suitable shouldered bolts 64 and receive the outer dies 55 therebetween. It will be clear that the rings 65 function to maintain the outer dies 55 all at the same vertical level.

The general forming operation of the present device can be seen from the sequence illustrated in FIGS. 1–4. In FIG. 1, the roughly formed double tapered workpiece 70 is inserted beneath the upper die 35 and supported in a manner to be described. This workpiece may be formed from a sheet or strip of material, the ends of which have been welded together and the opposite sides 70A of which are then flared outwardly to a certain extent.

Figure 2:
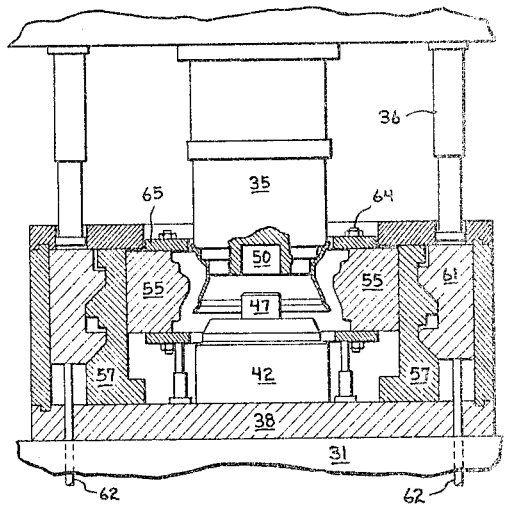

As shown in FIG. 2, the platen 32 may be moved downwardly whereby the upper die 35 enters the workpiece 70 and the posts 36 enter apertures 69 in the top 40 to force the annular cam 61 downwardly, moving the die carrying elements 57 inwardly and therewith the outer dies 55. It should be mentioned that a pair of hydraulic lifting jacks 71 are mounted on the base member 38 and hold the outer die assembly including the horizontal rings 65 and the outer dies 55 in an upward position as in FIGS. 1 and 2 with the outer dies almost engaging the top 40 of the housing 37 but prevented from such engagement by stop means described below.

The jacks 71 may include hydraulic means backed up by pressurized air. In other words, a constant air pressure is maintained in a suitable chamber (not shown) and acts against a piston which through hydraulic means exerts a constant upward force upon the outer die assembly through pistons 73 of jacks 71. This constant force is sufficiently great to lift the outer die assembly and maintain it yieldably in the upward position of FIGS. 1 and 2 adjacent the top 40.

Figure 3:
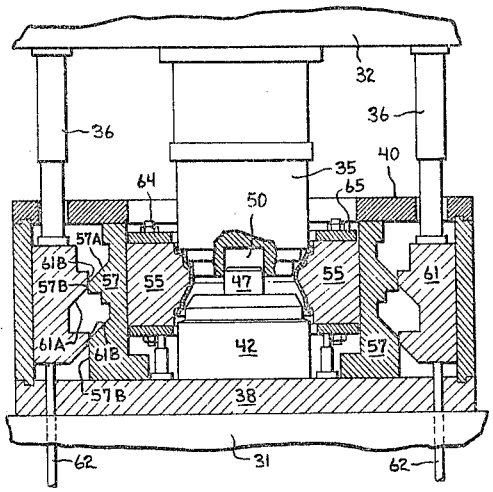

As the platen 32 continues to move downwardly, the annular cam 61 is forced downwardly to such a position that the tapered cam surfaces 57A and 61A of the cam and die carrying elements no longer engage, and instead the vertical surfaces 57B and 61B thereof engage (see FIG. 3). When this occurs, the outer dies 55 have reached their final innermost position.

Continued downward movement of the platen 32 causes the upper die 35 to force the workpiece 70 into engagement with the lower die and to form the workpiece 70 into its final shape. When the upper and lower dies are thus brought together and the outer dies are in their illustrated innermost position (see FIG. 4), the surfaces 51 and 52 are complementary to the surface 56. It will be noted that the outer die assembly will ride downwardly with the upper die against the action of the hydraulic lifting means 71.

The various details of the present apparatus are described and shown in the remaining figures along with the details of the ejecting apparatus and operation. Referring to FIG. 5, the housing 37 is shown as having the top 40 which is provided with six apertures 69 for receiving the posts 36. The top 40 has a central hexagonal opening 90 which receives the upper horizontal ring 65 when it is in its uppermost position as shown in FIG. 1. It will be noted that the upper ring 65 also has a hexagonal shape, the same as but slightly smaller than the opening 90 whereby the ring may be received within the opening.

Referring to FIGS. 6 and 7, the outer dies 55 are made up of two portions 91 and 92 which are fixed together by a suitable screw means 95. Portion 91 of each outer die has the forming face 56 on its inner surface. The horizontal rings 65 are fixed in spaced relation by means of bolts 64 which include an enlarged central portion 97 having shoulders 100 against which the ring 65 abuts. The rings 65 are held in such abutting relation by nuts 101 received upon reduced diameter threaded portions 102 of the bolts 96. On the mutually facing surfaces of the rings, there are provided bearing plates 105 against which the upper and lower surfaces of the dies 55 ride.

A plurality of keys 106 are fixed within suitable radially extending slots 107 in the rings 65 and provide a radial track for each of the outer dies 55, each key 106 being received in a radially extending slot 110 in the upper and lower surfaces of the outer dies 55. The above mentioned stop means which limits the outer dies upward movement comprises stop blocks 108 and 109 fixed respectively to the die carrying elements 57 and the outer dies 55. Two sets of the blocks are provided on the opposite sides of the device as suggested in FIG. 5. As suggested above, the lifting arrangements 71 normally maintain these blocks in engagement.

Figure 9:
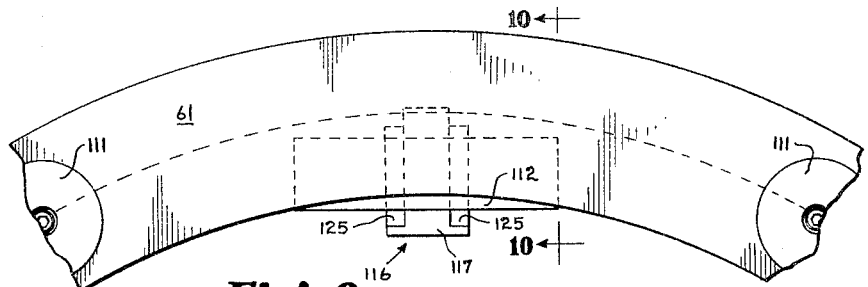
FIG. 9 is a top plan fragmentary view of an annular cam element showing means for attaching the cam element to accompanying structure.
Figure 10:
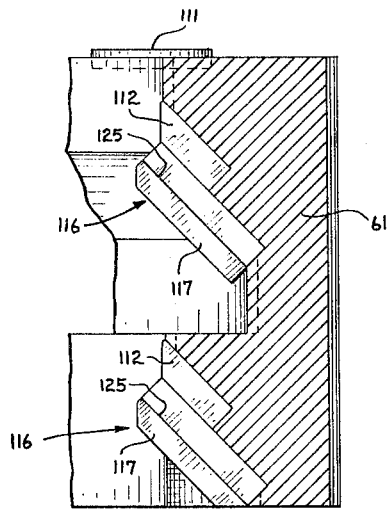
FIG. 10 is a vertical section taken along the line 10—10 of FIG. 9.
Figure 11:
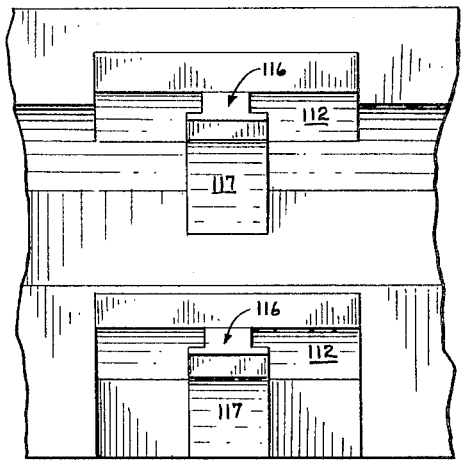
FIG. 11 is a front elevational view of the structure of FIG. 10.

The annular cam 61 has fixed thereto a plurality of bearing plates 111 (FIG. 9) which are engaged by the posts 36. The annular cam 61 has fixed thereto a plurality of bearing inserts 112 which cam against the cam surfaces 115 of the die carrying elements 57 when the die carrying elements are forced inwardly by downward movement of the annular cam 61.

Figures 13, 14:
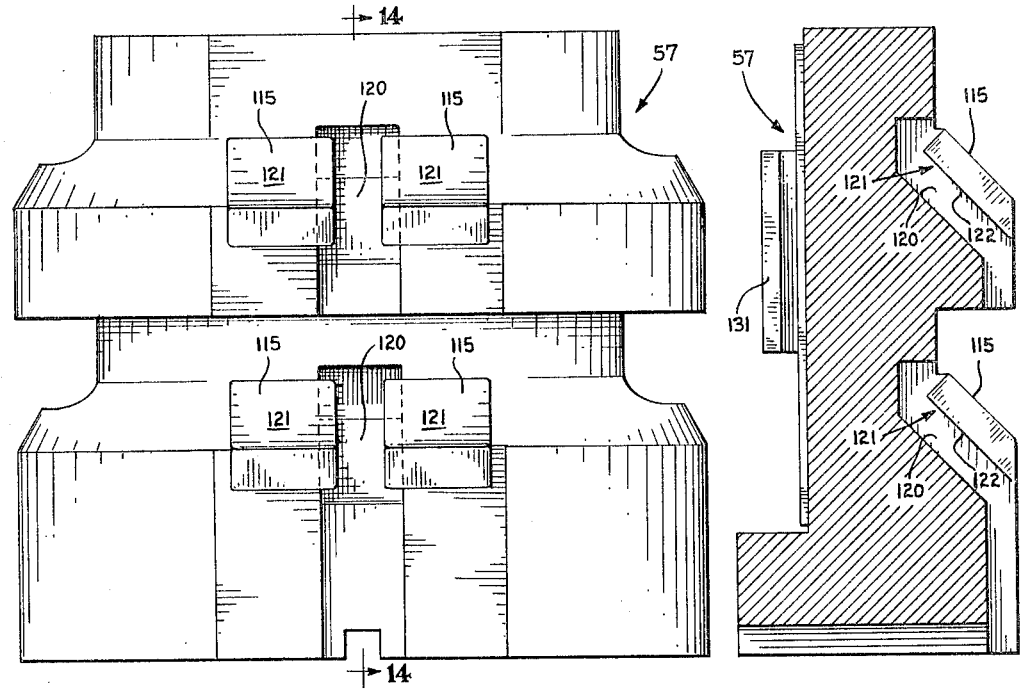
FIG. 13 is a side elevation of the structure of FIG. 12.
FIG. 14 is a vertical section taken along the line 14—14 of FIG. 13 in the direction of the arrows.

Also fixedly mounted upon the annular cam 61 is a plurality of T-elements 116, the heads 117 of which are received within slots 120 in each of the die carrying elements 57 (FIG. 13). Members 121 are fixed to the die carrying elements 57 adjacent the slots 120 so as to not only provide the surfaces 115 but also provide inner surfaces 122 against which the lower surfaces 125 of the T's 116 can act to draw the die carrying elements radially outwardly.

Figures 15, 16:
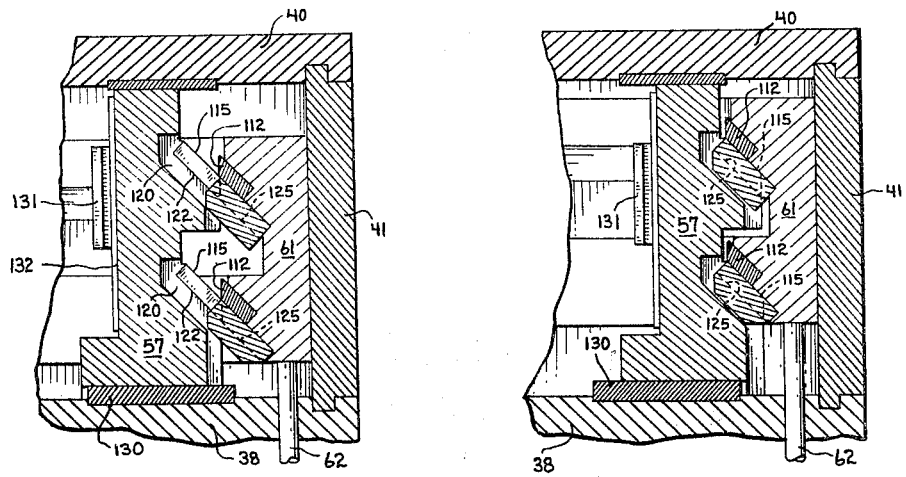
FIGS. 15 and 16 are vertical sections with portions removed taken along the line 15—15 of FIG. 5 and showing the structure of FIGS. 9–14 in assembled relation, FIG. 16 showing a different operating position than FIG. 15.
Figure 17:
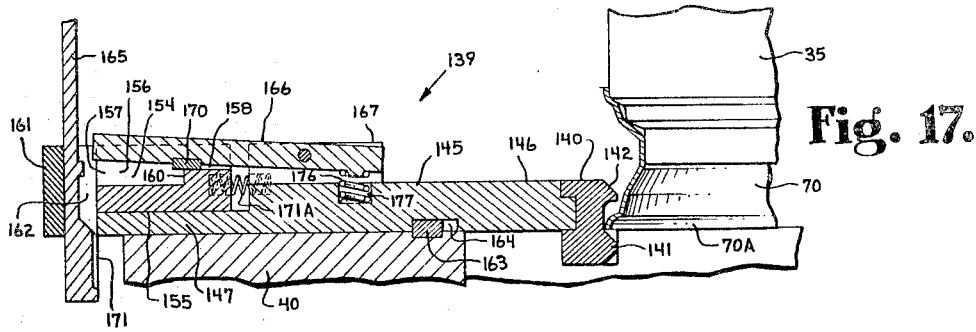
FIGS. 17–20 are vertical sections taken along the line 17—17 of FIG. 5 in the direction of the arrows and showing different operating positions of a means for disengaging the workpiece from the die.
Figure 18:
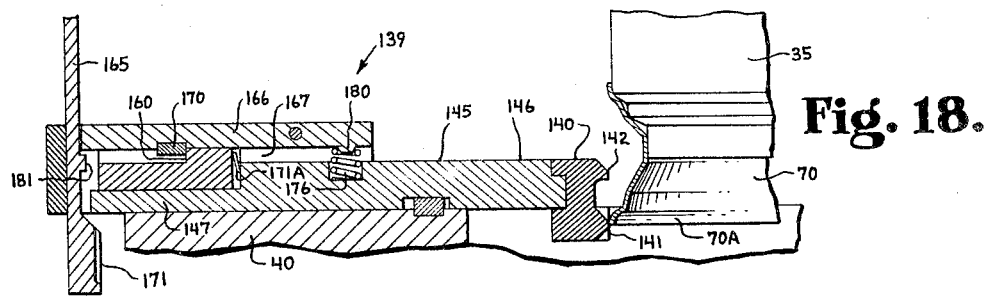
Figure 19:
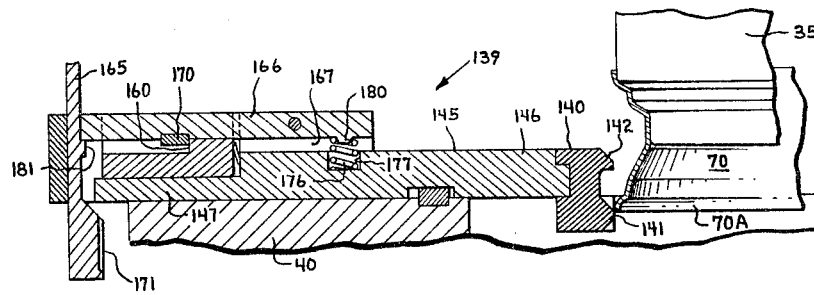
Figure 20:
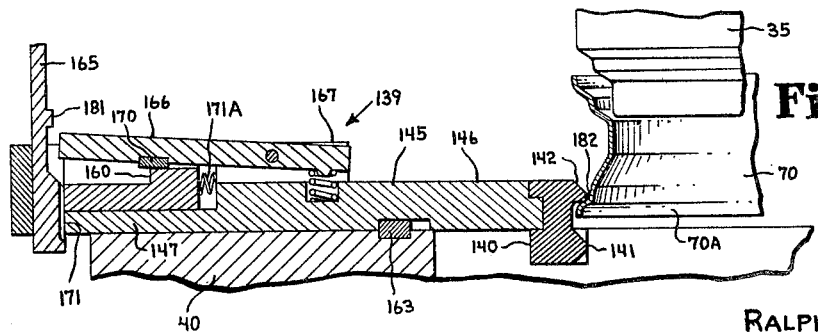

Referring to FIGS. 15 and 16, it can be appreciated that when the annular ring 61 is forced upwardly, the surfaces 125 will engage the surfaces 122 and cause the members 121 to slide therealong drawing the die carrying elements 57 outwardly.

Figure 12:
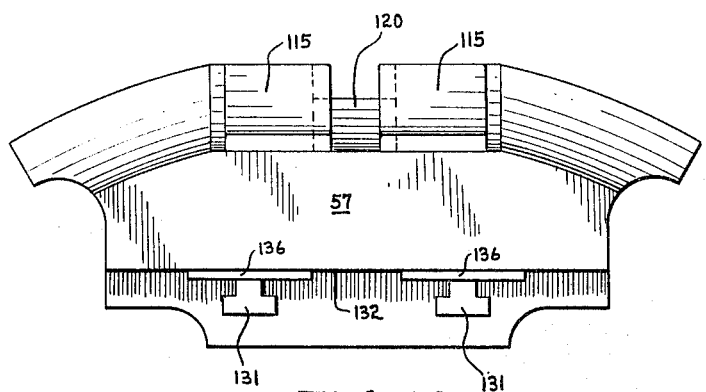
FIG. 12 is a top plan view of a die carrying element representative of a plurality of die carrying elements forming a part of the present structure.

Each of the die carrying elements 57 rides upon suitable bearings upon the base 38 of the housing 37 and is guided by a central key 130 fixed to the base and extending radially inwardly. Each of the die carrying elements 57 has a pair of vertically extending members 131 mounted on its inside face 132 (FIG. 12). The elements 131 each have a T-shaped cross section and are each received within a vertically extending aperture 135 of T-shaped cross section, two of which are formed in the rearward face of each outer die 55. The plates 136 (FIG. 12) upon which the T-elements 131 are directly mounted act as bearing surfaces for the face 137 of the outer dies 55. It can be seen that the T's 131 permit only vertical movement of the outer dies 55 with relation to the die carrying elements 57. Because each of the outer dies 55 is retained between the parallel spaced upper and lower horizontal rings 65, the outer dies 55 are always maintained at the same vertical level.

FIGS. 5 and 17–20 show a means 139 for disengaging the completed wheel rim after it has been formed and also for supporting the workpiece prior to forming. It should be understood that the means 139 is repeated on both sides of the apparatus in diametrically opposed relation but that only one such means 139 is shown and described. Referring to those figures, there is illustrated a double lipped member 140 having lips 141 (FIG 1) and 142. The member 140 is mounted upon a horizontally reciprocal member 145, which is enlarged at its inner end 146 and has a reduced size tongue 147 formed on its outer end. On the opposite sides of the member 145 are formed elongated guides 150 which slide within inwardly facing grooves 151 formed in the inside mutually facing surfaces of members 152 fixed to the top 40 of the housing 37. The tongue 147 is slidable within a lower groove 155 formed in the lower surface of a mounting block 156 also fixed to the top 40. The mounting block 156 also has an upper groove 154 which is deeper at its portion 157 than at its portion 158, said portions 157 and 158 being joined by a shoulder 160.

An insert 163 is fixed within the upper surface of the top 40, is received within an elongated recess 164 in the lower surface of the member 145 and limits the longitudinal movement of that member.

Fixed to the outermost end of the block 156 is a pair of members 159 which are spaced apart and having fixed thereto an outer plate 161 which defines with the members 159 a vertically extending aperture 162 within which rides a cam member 165 fixed to the platen 32 and movable therewith. An arm 166 is pivoted to a pair of horizontal members 167 which are fixed to or integral with the reciprocal member 145. In the lower surface of the arm 166, there is received an insert 170 which can be locked behind the shoulder 160 as in FIGS. 18 and 19.

The operation of the supporting and disengaging means 139 is illustrated serially in FIGS. 17–20. The workpiece 70 is inserted between the lips 141 and 142 by a sidewise motion of the workpiece so that the lower flaring portion 70A is received between the lips 141 and 142 of the opposing means 139. The members 145 are locked inwardly by the cam surface 171 on the cam member 165 and thus provide a solid support for the workpiece. When the press 32 moves downwardly and moves the upper die 35 downwardly toward the position of FIG. 17, the cam surface 171 prevents the member 145 from retracting until the upper die is firmly seated in the workpiece as in FIG. 17. Continued downward movement of the upper die 35 moves the cam surface 171 out of the path of the member 145 so that the lower flaring portion 70A of the workpiece cams against the tapered lip 141 and forces retraction of the member 145 against the action of compression springs 171A, the opposite ends of which are seated within suitable recesses in the block 156 and the member 145 and members 167.

When the lower flaring portion 70A of the workpiece passes the lower lip 141, it depresses the member 145 to such an extent that the insert 170 in the arm 166 drops behind the shoulder 160. A moment on the arm to assist this action is produced by a compression spring 176 received within a cylindrical recess 177 in the upper surface of the member 145. The opposite end of the spring 176 is received upon a downwardly projecting nipple 180 on the lower surface of the arm 166. Thus the members 145 and 140 and lips 141 and 142 are retained retracted during downward movement of the upper die, and the lips do not scrape the sides of the upper die during such downward movement.

When the die has completed the forming operation and again moves upwardly, it has the workpiece 70 engaged thereon. The die and workpiece are free to pass the lower lip 142 because of the fact that the arm 145 is held retracted by means of the insert 170 in engagement with the shoulder 160. After the lower flaring portion 70A passes the lip 141 (FIG. 19), continued upward movement of the press 32 causes a projection 181 on the cam rod 165 to engage the arm 166 and again return it to the upward position wherein the springs 171 are free to project the member 145 with its double lipped member 140 also being projected. The cam surface 171 also is raised as in FIG. 20 to block the members 145 and 140 in projected position. Thus, the upper lip 142 engages the recess 182 on the member 70 blocking further upward movement of the workpiece whereby further upward movement of the upper die withdraws the die from the workpiece 70.

After the upper die has moved upwardly to the position of FIG. 1, the workpiece 70 is free to be withdrawn sidewardly from beneath the platen and upper die and a new workpiece can be inserted in its place. It should be understood that the means 139 illustrated in FIGS. 17–20 is repeated on the opposite side of the device and that both means 139 operate as above described.

From the above description it will be obvious that the present invention provides an improved forming apparatus which has proved to be extremely accurate in the forming of double flaring annular members. It will also be clear that the present invention provides improved means for supporting the workpiece whereby the upper die can be firmly seated therein, said means also acting to remove and disengage the workpiece from the upper die after forming of the workpiece.

Figure 21:
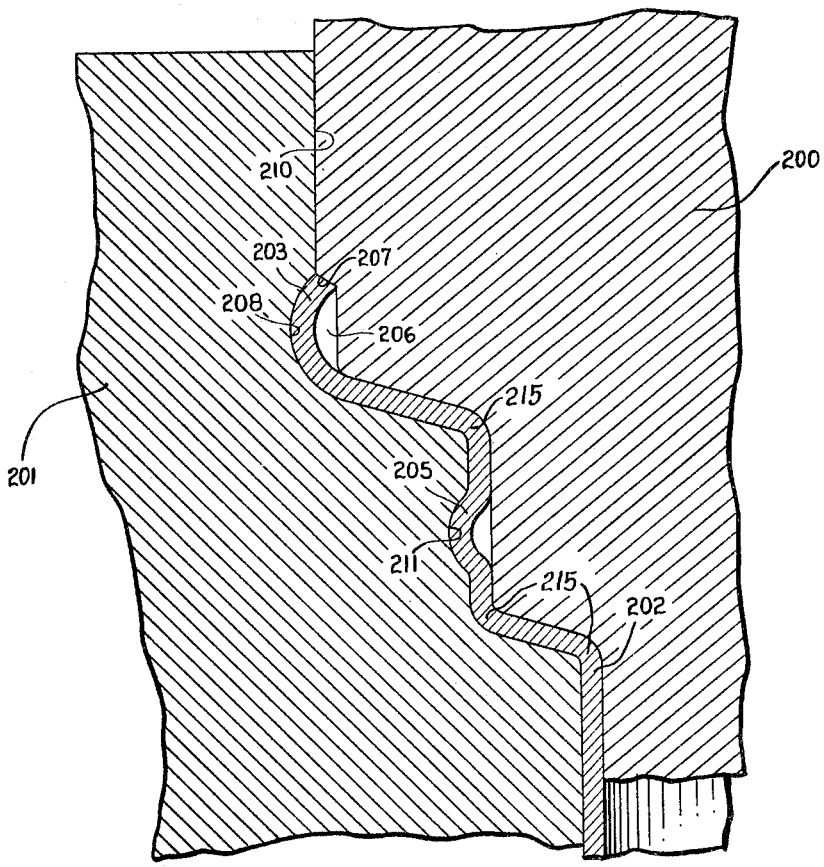
FIG. 21 is an enlarged fragmentary vertical section similar to and in the same operating position as FIG. 4 of an alternative embodiment of the present invention.

Referring to FIG. 21, there is illustrated an alternative embodiment of the present invention which is identical to the above described embodiment with the exceptions set forth below.

An upper die 200 is provided corresponding to the upper die 35 and outer die sections 201 correspond to the outer die sections 55. The workpiece 202 is a wheel rim for an automobile. Such wheel rims conventionally require a curl 203 at the edges thereof to reduce the possibility of cutting a tire when it is being mounted on the wheel rim. Such wheel rims further require a safety bead 205 for retaining the edge of the tire in proper position adjacent the edge of the wheel rim after a blow-out occurs.

Consequently, there is provided in the upper die 200 an annular recess or indentation 206 which defines a stuffing ledge 207. There is also provided in each outer die section 201 an inwardly facing concave recess 208. When the outer die sections are in the illustrated most inward position, the concave recesses thereof define an annular concave inwardly facing recess which cooperates with the stuffing ledge 207 to form the curl 203.

The dies of the present embodiment move in exactly the manner described above during the forming operation. That is, the outer dies move to their most inward position prior to the complete coming together of the upper and lower dies. After the outer dies have moved to their most inward position, the upper die travels downwardly with the stuffing ledge 207 moving along the inwardly facing surface 210 of the outer dies. This action causes the edge of the wheel rim to be held inwardly and stuffs the metal downwardly between the upper die and the outer die.

When the upper die bottoms against the lower die, the edge of the wheel rim moves outwardly into the recess 208 to form the desired curl 203 as shown in FIG. 21. The outer dies also have formed therein inwardly facing concave indentations 211 which, when the outer dies are in their most inward position, define an annular concave inwardly facing recess. The stuffing action of the stuffing ledge not only moves the metal downwardly between the outer and upper dies reducing "thin out," but also causes the metal to expand outwardly into the indentations 211 forming the safety bead 205. Stated in another way, the metal thickness is restored to the clearance provided between the punch and the dies. Furthermore, an actual thickening of material is produced at the points desired such as at 215 in FIG. 21 by reason of the operation of the stuffing ledge.

The structure and operation of the lower die (not shown) of this alternative embodiment is also modified in exactly the manner described to form a curl and safety bead on the opposite side of the wheel rim.

The invention claimed is:

1. Forming apparatus comprising a pair of elements each having a pair of projecting lips adapted to receive a workpiece therebetween for supporting the workpiece when said elements are in a first position, the lips of one element projecting toward the lips of the other element so that the elements engage the opposite sides of the workpiece when the elements are in said first position, a forming die movable through a path between an initial position and a position at which the die forms the workpiece, the lips of each pair being spaced apart in the direction of said path, a further position of said die along said path being such that the die is received by and firmly seated upon the workpiece being supported by said elements, said elements being reciprocal away from one another from said first position to a second position wherein said lips are disengaged from said workpiece, a pair of cams fixed with relation to said die and movable therewith, said cams having cam surfaces adapted to locate and hold said elements in said first position when said die is between said initial and further positions and to release said elements for movement away from said first position when said die is between said forming position and said further position, spring means yieldably holding said elements in said first position, and latch means arranged to automatically lock said elements in said second position upon movement of said elements thereto, and projections upon said cams positioned to disengage said latch means as said die moves into said further position from said forming position.

2. Forming apparatus comprising a stationary base, a generally conical lower die fixed to and pointing upwardly from said base, a cylindrical guide of reduced diameter relative to said die and fixed to the upper end of said die, said guide pointing upwardly with the axis of said guide being vertical and coaxial with said die, a platen mounted for vertical movement over said base, a generally conical upper die fixed to said platen and pointing downwardly toward said lower die, said upper die being coaxial with said lower die and having a cylindrical aperture in its lower face coaxial with said cylindrical guide and equal in diameter thereto, means for moving said platen vertically between an upper position and a lower position wherein said upper die seats against said lower die with said cylindrical guide received in said cylindrical aperture, a plurality of die carrying elements mounted upon said base for radial movement relative to the axis of said upper and lower dies, a plurality of outer die elements each mounted upon one of said die carrying elements for vertical movement with respect thereto, a pair of horizontal rings fixed in parallel spaced relationship to one another and arranged in coaxial relation to said upper and lower dies, said rings engaging and receiving said outer dies therebetween and being keyed to said outer dies by radially extending keys whereby said outer dies can move only radially with respect to said rings, said rings acting to prevent vertical movement of any of said outer dies with respect to the remaining outer dies, a housing fixed to said base and surrounding said lower and outer dies, stop means fixed to said die carrying elements and limiting upward movement of said outer dies, means mounted on said base and acting against the lowermost of said rings to yieldably hold it and the outer dies upwardly with the outer dies in engagement with said stop means, an annular cam member received within said outer housing and surrounding said die carrying elements, each of said die carrying elements and said cam element having mutually engaging outwardly and downwardly tapering cam surfaces whereby, when said cam element is forced downwardly, said die carrying elements are moved inwardly, said cam element and die carrying elements being keyed together by T-elements whereby upward movement of said cam member draws said die carrying elements outwardly, means carried by said platen for forcing said cam element downwardly, a pair of workpiece supporting elements reciprocably mounted on said housing for radial movement relative to said dies and each having a pair of lips spaced in the direction of movement of said upper die, each pair of said lips being adapted to receive a workpiece therebetween for supporting the workpiece when said supporting elements are in a first position, the lips of one element projecting towards the lips of the other element so that the elements engage the opposite sides of the workpiece when the elements are in said first position, said supporting elements being reciprocal away from one another to a second position wherein said lips are disengaged from said workpiece, said platen being movable to a further position between said upper and lower position wherein said upper die is firmly seated within a workpiece supported between said lips, a pair of cam members fixed with relation to said die and movable therewith, said cam members each having a cam surface adapted to locate and hold said workpiece supporting elements in said first position when said platen is between said upper and said further position and to release said workpiece supporting elements for movement to said second position when said platen is between said lower position and said further position.

3. Forming apparatus comprising a pair of coaxial generally conical dies pointing toward one another, means for moving said dies together whereby said dies may be seated within the opposite ends of an annular workpiece in engagement with the inner surface of the workpiece, a plurality of outer dies arranged in a pattern coaxial with said generally conical dies, and means for moving said outer dies radially inwardly to a position wherein the inner surfaces of said outer dies engage the outer surface of said workpiece and cooperate with said generally conical dies to form the workpiece, said generally conical dies being provided with mutually facing stuffing ledges which cooperate with said outer dies to stuff the material of the workpiece between said outer dies and said generally conical dies, said outer dies including inwardly facing indentations which provide forming surfaces for the material stuffed by said stuffing ledges said generally conical dies each having a generally conical forming surface and a straight shank of uniform cross section with the stuffing ledge of each die being between the shank and the generally conical forming surface of the respective dies; said outer dies including surfaces which define, when said outer dies are in said position, straight surfaces of uniform cross section complementary to said respective shanks and within which said shanks are movable and across which said stuffing ledges move to stuff the material of the workpiece.

4. Forming apparatus comprising a pair of coaxial generally conical dies pointing toward one another; first means for moving said dies toward one another whereby said dies may be seated within the opposite ends of an annular workpiece in engagement with the inner surface of the workpiece; a plurality of outer dies arranged in a pattern coaxial with said generally conical dies; said first means also being operable after said conical dies have been so moved together to move said outer dies radially inwardly to a position wherein the inner surfaces of said outer dies engage the outer surface of said workpiece; said first means being operable after said outer dies have been so moved inwardly to move said conical dies firmly together; said generally conical dies being provided with mutually facing stuffing ledges which cooperate with said outer dies, as said conical dies are moved firmly together, to stuff the material of the workpiece between said outer dies and said generally conical dies; said outer dies including inwardly facing indentations which provide forming surfaces for the material stuffed by said stuffing ledges said generally conical dies each having a generally conical forming surface and a straight shank of uniform cross section with the stuffing ledge of each die being between the shank and the generally conical forming surface of the respective dies; said outer dies including surfaces which define, when said outer dies are in said position, straight surfaces of uniform cross section complementary to said respective shanks and within which said shanks are movable and across which said stuffing ledges move to stuff the material of the workpiece.

5. Forming apparatus comprising a pair of coaxial generally conical dies pointing toward one another; a plurality of outer dies arranged in a pattern coaxial with said generally conical dies; and first means for moving said outer dies radially inwardly to a position wherein said outer dies are generally between the conical dies and the inner surfaces of said outer dies engage the outer surface of an annular workpiece, said first means being operable when said outer dies are so positioned to move said conical dies together; said conical dies being provided with mutually facing stuffing ledges which cooperate with said outer dies, as said conical dies are moved together, to stuff the material of the workpiece between said outer dies and said generally conical dies; said outer dies including inwardly facing indentations which provide forming surfaces for the material stuffed by said stuffing ledges said generally conical dies each having a generally conical forming surface and a straight shank of uniform cross section with the stuffing ledge of each die being between the shank and the generally conical forming surface of the respective dies; said outer dies including surfaces which define, when said outer dies are in said position, straight surfaces of uniform cross section complementary to said respective shanks and within which said shanks are movable and across which said stuffing ledges move to stuff the material of the workpiece.

6. Forming apparatus comprising a pair of coaxial generally conical dies pointing toward one another; a plurality of outer dies arranged in a pattern coaxial with said generally conical dies; and first means for moving said outer dies radially inwardly to a position wherein the inner surfaces of said outer dies engage the outer surface of an annular workpiece, said first means being operable when said outer dies are so positioned to move said conical dies together, said generally conical dies being provided with mutually facing stuffing ledges which cooperate with said outer dies to stuff the material of the workpiece between said outer dies and said generally conical dies, said outer dies including inwardly facing indentations which provide forming surfaces for the material stuffed by said stuffing ledges, said outer dies being relatively free to move in the direction of movement of said conical dies to equalize the stuffing action between the outer dies and one conical die and the stuffing action between the outer dies and the other conical die said generally conical dies each having a generally conical forming surface and a straight shank of uniform cross section with the stuffing ledge of each die being between the shank and the generally conical forming surface of the respective dies; said outer dies including surfaces which define, when said outer dies are in said position, straight surfaces of uniform cross section complementary to said respective shanks and within which said shanks are movable and across which stuffing ledges move to stuff the material of the workpiece.

7. Forming apparatus comprising a pair of coaxial generally conical dies pointing toward one another; a plurality of outer dies arranged in a pattern coaxial with said generally conical dies; and first means for moving said outer dies radially inwardly to a position wherein said outer dies are generally between the conical dies and the inner surfaces of said outer dies engage the outer surface of an annular workpiece, said first means being operable when said outer dies are so positioned to move said conical dies together; said conical dies being provided with mutually facing stuffing ledges which cooperate with said outer dies, as said conical dies are moved together, to stuff the material of the workpiece between said outer dies and said generally conical dies; said outer dies including inwardly facing indentations which provide forming surfaces for the material stuffed by said stuffing ledges, said outer dies having inner surfaces which define, when said outer dies are in said position, an annular configuration having a relatively small central diameter and flaring end portions of greater diameters which configuration is generally complementary to the surfaces of said generally conical dies; said inwardly facing indentations being located in said flaring end portions; said generally conical dies having surfaces which are inward of said indentations when said conical dies are moved together and which extend in the direction of movement of said conical dies and are spaced from the workpiece when the conical dies are together.

8. The forming apparatus of claim 7 in which said last mentioned surfaces are spaced a greater distance from said indentations, when said conical dies are together, than the conical dies are spaced from said outer dies at portions thereof away from said indentations.

9. Apparatus for forming an annular double flaring workpiece comprising a stationary base, a generally conical lower die fixed to and pointing upwardly from said base, a platen mounted for vertical movement over said base, a generally conical upper die fixed to said platen and pointing downwardly toward said lower die in coaxial relation with said lower die, means for moving said platen vertically between an upper position and a lower position wherein said upper die seats against said lower die, a plurality of die carrying elements mounted upon said base for radial movement relative to the axis of said upper and lower dies, a plurality of outer die elements each mounted upon one of said die carrying elements for vertical movement with respect thereto, a pair of horizontal rings fixed in parallel spaced relationship to one another and arranged in coaxial relation to said upper and lower dies, said rings engaging and receiving said outer dies therebetween and being keyed to said outer dies by radially extending keys whereby said outer dies can move only radially with respect to said rings, said rings acting to prevent vertical movement of any of said outer dies with respect to the remaining outer dies, a housing fixed to said base and surrounding said lower and outer dies, stop means fixed to said die carrying elements and limiting upward movement of said outer dies, means mounted on said base and acting against the lowermost of said rings to yieldably hold it and the outer dies upwardly with the outer dies in engagement with said stop means, an annular cam member received within said outer housing and surrounding said die carrying elements, each of said die carrying elements and said cam element having mutually engaging outwardly and downwardly tapering cam surfaces whereby, when said cam element is force downwardly, said die carrying elements are moved inwardly, said cam element and die carrying elements being also keyed together by elements of T-cross section whereby upward movement of said cam member draws said die carrying elements outwardly, and means carried by said platen for forcing said cam element downwardly, said platen being movable through an intermediate position between said upper and lower position, said cam and said die carrying elements having vertically extending surfaces which are in engagement when said platen is between said intermediate and lower positions locking said die carrying elements in an innermost position, said conical dies being provided with muually facing stuffing ledges which cooperate with said outer dies while they are locked in said innermost position to stuff the material of the workpiece between said outer dies and said generally conical dies, said outer dies including inwardly facing indentations which provide forming surfaces for the material stuffed by said stuffing ledges, said upper and lower dies having vertical surfaces which are inward of said indentations when said upper and lower dies are moved together and which are spaced a greater distance from said indentations than the upper and lower dies are spaced from said outer dies at portions thereof away from said indentations.

References Cited by the Examiner

UNITED STATES PATENTS

| 1,973,890 | 9/1934 | Tormyn et al. | 72—399 |
| 2,268,838 | 1/1942 | Lyon | 113—116 |
| 2,659,407 | 11/1953 | Kay | 192—129 |
| 2,826,161 | 3/1958 | Palmer | 72—345 |
| 2,966,872 | 1/1961 | Schmocker | 75—55 |

CHARLES W. LANHAM, *Primary Examiner.*

RICHARD J. HERBST, *Assistant Examiner.*